(12) United States Patent
Kaminski et al.

(10) Patent No.: US 7,543,385 B2
(45) Date of Patent: Jun. 9, 2009

(54) METHOD FOR MANUFACTURING ROLLING CONTACT SURFACES

(75) Inventors: Jacek Kaminski, Mölnlycke (SE); Henning Wittmeyer, Hilversum (NL)

(73) Assignee: Aktiebolaget SKF, Gothenburg (SE)

( * ) Notice: Subject to any disclaimer, the term of this patent is extended or adjusted under 35 U.S.C. 154(b) by 491 days.

(21) Appl. No.: 10/962,608

(22) Filed: Oct. 13, 2004

(65) Prior Publication Data

US 2005/0102837 A1    May 19, 2005

(30) Foreign Application Priority Data

Oct. 14, 2003    (SE)    ................... 0302706-7

(51) Int. Cl.
*B21D 53/10*    (2006.01)
*B24B 1/04*    (2006.01)
(52) U.S. Cl. .............. 29/898.13; 89/898; 89/557; 451/49; 451/57
(58) Field of Classification Search ............... 29/898, 29/898.13, 557; 451/49, 57, 165
See application file for complete search history.

(56) References Cited

U.S. PATENT DOCUMENTS

| | | | |
|---|---|---|---|
| 4,856,466 A | 8/1989 | Ting et al. | |
| 5,885,690 A | 3/1999 | Sada | |
| 6,810,781 B2 * | 11/2004 | Peters et al. | ............ 83/581 |
| 6,932,876 B1 * | 8/2005 | Statnikov | ............ 148/558 |
| 2002/0073548 A1 * | 6/2002 | De Vries et al. | ....... 29/898.061 |
| 2003/0176152 A1 * | 9/2003 | Lugt et al. | ............ 451/57 |

FOREIGN PATENT DOCUMENTS

| | | |
|---|---|---|
| EP | 0 675 264 A1 | 10/1995 |
| EP | 0 805 291 B1 | 8/2001 |
| EP | 1 012 488 B1 | 12/2002 |
| WO | 9719279 A | 5/1997 |

\* cited by examiner

*Primary Examiner*—David P Bryant
*Assistant Examiner*—Sarang Afzali
(74) *Attorney, Agent, or Firm*—Buchanan Ingersoll & Rooney PC

(57) ABSTRACT

Method for manufacturing improved contact surfaces, particularly contact surfaces in rolling bearing components such as rings or rolling bodies, is disclosed. The method subjects a surface of the rolling bearing component to a hard turning machining operation for forming by means of a hard turning tool a rolling or sliding contact surface. The hard turned surface is subjected to a finishing operation to remove the basic turning groove structure in a light machining way such that micro-pockets created in the hard turning operation remain. The hard turning tool during the hard turning machining operation is subjected to a vibration, substantially in the longitudinal direction of the tool, thereby creating in a controlled manner in the hard-turned surface a number of indentations, which are substantially arc-shaped in cross-sectional direction, prior to the finishing operation. Indentations improve lift-off and lubricating properties during later operation of the rolling bearing.

11 Claims, 1 Drawing Sheet

METHOD FOR MANUFACTURING ROLLING CONTACT SURFACES

RELATED APPLICATION DATA

This application is based on and claims priority under 35 U.S.C. §119 to Swedish Application No. 0302706-7, filed Oct. 14, 2003, the entire contents of which are incorporated herein by reference.

FIELD OF THE DISCLOSURE

The present disclosure refers to a method for manufacturing improved rolling contact surfaces. Specifically, the disclosure relates to a method for forming indentations with a substantially arc-shaped cross-section in the rolling or sliding contact surface that, during later operation of a rolling bearing, improves lift-off and lubricating properties.

STATE OF THE ART

In the discussion of the state of the art that follows, reference is made to certain structures and/or methods. However, the following references should not be construed as an admission that these structures and/or methods constitute prior art. Applicants expressly reserve the right to demonstrate that such structures and/or methods do not qualify as prior art against the present invention.

In rolling bearings, there are rolling bodies which under operation are rolling and partly sliding in contact with race tracks and flanges provided in race rings of the bearing. Such bearings need proper lubrication, usually in the form of an oil film, for operating in a proper manner to minimize wear and excessive heating. Particularly in applications where the rings of the bearing rotate at a comparatively low speed relative to each other, and/or in hot, humid or contaminated environments, there is often a need of additional measures for ascertaining a proper lubrication.

An earlier method for improving the oil film forming ratio at such rolling contact surfaces provided the surface with a topography with recesses or indentations. Generally, the recesses were separated by lands and the recesses or indentations were arranged to contain a lubricant. Such rolling contact surfaces with mutually isolated recesses are earlier known, e.g., from WO-A-9719279 and from EP 1 012 488 B 1, where the recesses are made as substantially spherical indentations created by subjecting the surfaces to a shot peening or shot blasting operation. Due to the method by which such a surface has obtained its recesses, it is apparent that the distribution over the surface will be arbitrary, and each recess will get a substantially circular surface edge.

SUMMARY

The presently disclosed manufacturing method provides a method for manufacturing improved rolling contact surfaces. The rolling contact surface of at least one of the rolling bodies and/or raceways or flanges of the bearing rings is provided with surface indentations. The indentations are made in a controlled manner.

An exemplary embodiment of a method for manufacturing rolling or sliding contact surfaces comprises providing a rolling bearing component, forming a rolling or sliding contact surface on the rolling bearing component with a hard turning tool in a hard turning machining operation, and vibrating the hard turning tool during forming of the a rolling or sliding contact surface. The hard turning tool is vibrated substantially in a longitudinal direction of the hard turning tool to create a plurality of indentations in the rolling or sliding contact surface. The indentations are substantially arc-shaped in cross-sectional direction and, during later operation of a rolling bearing having such a bearing component, improve lift-off and lubricating properties. The method also comprised removing a basic turning groove structure in the rolling or sliding contact surface having the plurality of indentations in a finishing operation, wherein at least a portion of the plurality of indentations are retained.

BRIEF DESCRIPTION OF THE DRAWINGS

The following detailed description of preferred embodiments can be read in connection with the accompanying drawings in which like numerals designate like elements and in which.

DETAILED DESCRIPTION OF THE PREFERRED EMBODIMENT

The bearing rings are machined by means of hard turning, which is a now used machining method for such manufacture, and which is a turning operation performed on a material which has the hardness required by the final rolling bearing application. This hardness can be obtained by special treatment of the originally softer material; alternatively the hardness may be inherent in the material as in ceramic. Such a hard turning operation allows significantly higher flexibility in ring manufacturing as compared to earlier manufacturing methods. After the final cut in such a turning, a subsequent finishing operation is used in order to remove the basic turning groove structure. Removal is performed, typically in a light machining operation, such that the micro-pockets created in the hard turning operation remain. Such light machining operations can be, e.g., burnishing, honing, and/or electrochemical machining in combination with honing.

Figure 1:
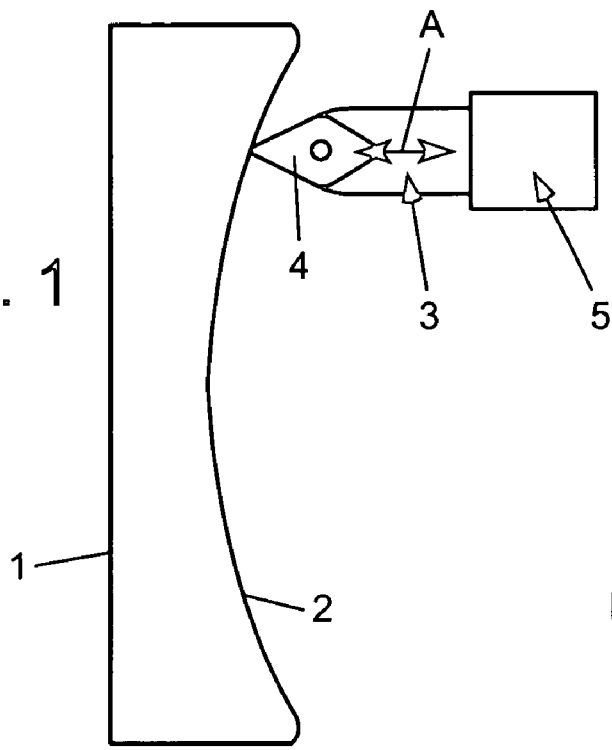
FIG. 1 schematically illustrates an exemplary embodiment of a manufacturing method according to the methods disclosed herein.

FIG. 1 illustrates in a very schematic manner the principle for manufacturing an improved rolling contact surface in accordance with the methods disclosed herein. FIG. 1 shows a section of a bearing ring 1, which in the embodiment illustrated has a spherical inner race track 2. However, the form of the race track is not critical and the race track can have other cross-sectional shapes than that shown. The hard turning machine is illustrated just as a hard turning tool, comprising a tool holder 3 and a tool bit 4. The hard turning tool is moved across the surface to be hard turned in any commonly known manner. The surface is simultaneously rotated. Means for feeding the tool bit 4 in this machining operation are not illustrated, as such means are commonly known.

In exemplary embodiments of the methods disclosed herein, the tool holder 3 is acted upon by an actuator 5. The actuator 5 is adapted to impose upon the tool holder, and thereby upon the tool bit 4, a controlled vibration in a direction illustrated with the arrow A in FIG. 1, e.g., in a substantially (e.g., ±15°) longitudinal direction of the tool 4.

By carefully synchronizing the cutting parameters, such as feed rate, rotational speed and vibration frequency and amplitude, it is possible to generate improved bearing properties by creating in the hard turned race surfaces random micro-pockets, which have an orientation in the rolling direction of the rollers. After a subsequent light-machining operation the rolling contact surfaces will give improved lift-off and lubrication properties.

Due to the nature of the vibration or movement of the tool bit in the longitudinal direction of the tip of the tool bit, the small indentations caused in the surface will have a substantially elliptic surface edge with the long axis oriented substantially (e.g., within ±45°) in the same direction as the axis of a roller rolling over the surface, i.e., with its long axis transversely to the rolling direction of the roller.

This orientation of the indentations or micro-size pockets is very beneficial for the lift-off and the lubrication properties of a bearing having a rolling contact surface with such a topography, as the edges of these micro-pockets during over-rolling of the rollers will be subjected to an elastic micro-deformation causing an extra, smaller amount of the lubricant contained in the micro-pockets to be pressed out and be fed into the contact area as an elasto-hydrodynamic lubrication film. With such shaped pockets or indentations, e.g., oval, elliptical, and so forth, substantially oriented with their long axis in the rolling direction of the rollers, most of the lubricant contained in each pocket would be expelled at the first over-rolling of a roller, as the lubricant subjected to a thrust by means of the elastic micro-deformation, in that case would not meet any hinder formed by the comparatively steep longitudinal edges of the micro-pockets, but instead the gently sloping end edges thereof.

Figure 2:
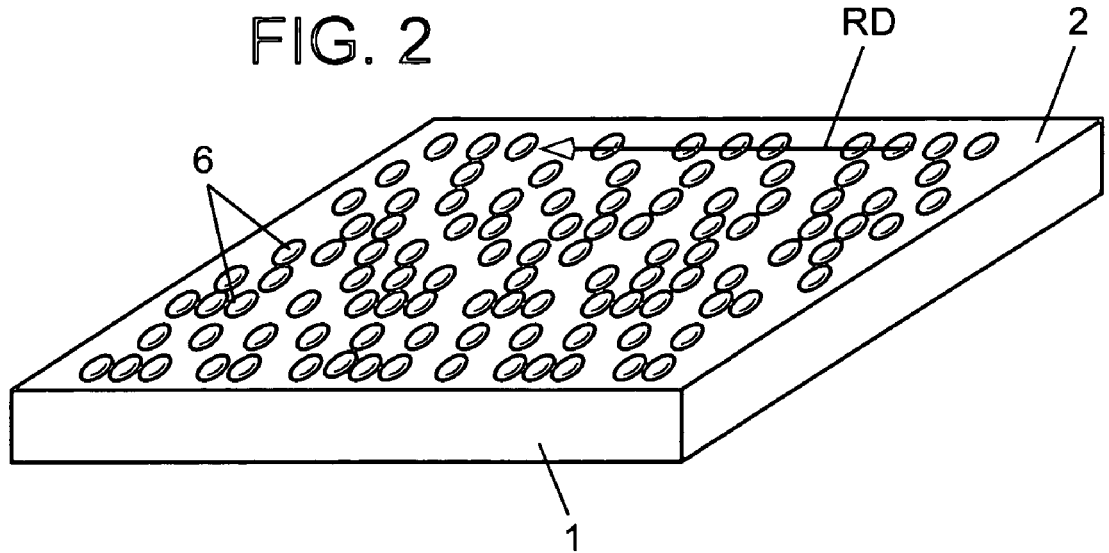
FIG. 2 is a perspective view of an exemplary embodiment of a rolling contact surface manufactured in accordance with the method.

In FIG. 2 is shown in a perspective view an embodiment of the appearance of such indentations or micro-pockets 6, made in the rolling contact surface 2 of a race ring 1, seen only as a planar material section. Due to the method used for creating this surface topography, it is possible to obtain in a controlled manner, a randomly distributed number of such micro-pockets 6, which are able to contain lubricant and to expel smaller amounts of that lubricant when the surface with the micro-pockets are rolled over by a rolling body in a bearing, and where the shape of each micro-pocket 6 is oval or elliptic with the long axis of the indentation positioned transverse to the rolling direction RD of the rolling body.

Figure 3:
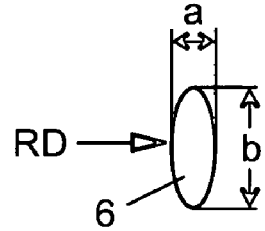
FIG. 3 is a view from above showing an example of one of the micro-pockets in the contact surface.

In FIG. 3 is illustrated an example of a micro-pocket 6 in a view from above, and in which is clearly seen that the short axis a of which is much shorter than the long axis b, and that the long axis b is positioned substantially perpendicular to the rolling direction RD for the rolling bodies. Preferably the long axis b is within ±45° of perpendicular to the rolling direction RD, more preferably within ±30° and most preferably within ±15° or less.

Figure 4:
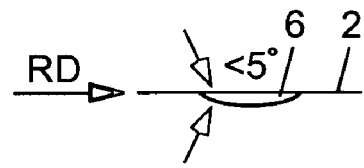
FIG. 4 is a cross sectional view of the micro-pocket according to FIG. 3, but in a bigger scale.

FIG. 4 which is a section through the contact surface 2, shows in bigger scale a micro-pocket 6, illustrating the maximum angle of the pocket edge as seen in the rolling direction RD. The cutting parameters, such as feed rate, rotational speed and vibration frequency and amplitude, for the hard-turning operation are synchronized thus that the average angle defined by the wall of the indentation 6 at its intersection of the adjacent portion of the rolling contact surface is less than 5°.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method for manufacturing rolling or sliding contact surfaces, the method comprising:
   providing a component,
   forming a rolling or sliding contact surface on the component with a hard turning tool in a hard turning machining operation;
   vibrating the hard turning tool during forming of the rolling or sliding contact surface, wherein the hard turning tool is vibrated substantially in a longitudinal direction of the hard turning tool to create a plurality of indentations in the rolling or sliding contact surface, which indentations are substantially arc-shaped in cross-sectional direction and which indentations during later operation of such component improve lift-off and lubricating properties; and
   removing a basic turning groove structure in the rolling or sliding contact surface having the plurality of indentations in a finishing operation, wherein at least a portion of the plurality of indentations are retained.

2. The method as claimed in claim 1, comprising synchronizing a plurality of cutting parameters to create the plurality of indentations in the rolling or sliding contact surface.

3. The method as claimed in claim 2, wherein an average angle defined by a wall of the indentation at an intersection of the wall and an adjacent portion of the rolling or sliding contact surface is less than 5°.

4. The method as claimed in claim 2, wherein the plurality of cutting parameters include at least one of feed rate, rotational speed, tool nose radius and vibration frequency and amplitude for the hard turning machining operation.

5. The method as claimed in claim 1, wherein the plurality of indentations have a form of a micro-pocket having a substantially oval or elliptic shape with a long axis of the micro-pocket arranged transversally to a rolling direction of a rolling body in contact with the rolling or sliding contact surface.

6. A method for manufacturing rolling or sliding contact surfaces, the method comprising:
   providing a rolling bearing component,
   forming a rolling or sliding contact surface on the rolling bearing component with a hard turning tool in a hard turning machining operation;
   vibrating the hard turning tool during forming of the rolling or sliding Contact surface, wherein the hard turning tool is vibrated substantially in a longitudinal direction of the hard turning tool to create a plurality of indentations in the rolling or sliding contact surface, which indentations are substantially arc-shaped in cross-sectional direction and which indentations during later operation of a rolling bearing having such bearing component improve lift-off and lubricating properties; and
   removing a basic turning groove structure in the rolling or sliding contact surface having the plurality of indentations in a finishing operation, wherein at least a portion of the plurality of indentations are retained.

7. The method as claimed in claim 6, comprising synchronizing a plurality of cutting parameters to create the plurality of indentations in the rolling or sliding contact surface.

8. The method as claimed in claim 7, wherein an average angle defined by a wall of the indentation at an intersection of the wall and an adjacent portion of the rolling or sliding contact surface is less than 5°.

9. The method as claimed in claim 7, wherein the plurality of cutting parameters include at least one of feed rate, rotational speed, tool nose radius and vibration frequency and amplitude for the hard turning machining operation.

10. The method as claimed in claim 6, wherein the plurality of indentations have a form of a micro-pocket having a substantially oval or elliptic shape with a long axis of the micro-pocket arranged transversally to a rolling direction of a rolling body in contact with the rolling or sliding contact surface.

11. The method as claimed in claim 6, wherein the rolling or sliding contact surface is a ring or rolling body in a rolling bearing.

\* \* \* \* \*